US009918197B2

(12) United States Patent
Labarca

(10) Patent No.: US 9,918,197 B2
(45) Date of Patent: Mar. 13, 2018

(54) INTERACTIVE ADVERTISEMENT ENVIRONMENT

(75) Inventor: Gonzalo Labarca, Boca Raton, FL (US)

(73) Assignee: Lazo Inc., Boca Raton, FL (US)

(*) Notice: Subject to any disclaimer, the term of this patent is extended or adjusted under 35 U.S.C. 154(b) by 473 days.

(21) Appl. No.: 13/252,703

(22) Filed: Oct. 4, 2011

(65) Prior Publication Data
US 2012/0095839 A1 Apr. 19, 2012

Related U.S. Application Data

(60) Provisional application No. 61/389,453, filed on Oct. 4, 2010.

(51) Int. Cl.
H04W 4/02 (2018.01)
G06Q 30/02 (2012.01)

(52) U.S. Cl.
CPC ........ H04W 4/025 (2013.01); G06Q 30/0261 (2013.01)

(58) Field of Classification Search
None
See application file for complete search history.

(56) References Cited

U.S. PATENT DOCUMENTS

2007/0055562 A1* 3/2007 Kralik .............................. 705/10
2008/0215429 A1* 9/2008 Ramer et al. .................... 705/14
2009/0149199 A1* 6/2009 Maghoul ..................... 455/456.3
2009/0149499 A1 6/2009 Maghoul
2010/0331043 A1* 12/2010 Chapman et al. .......... 455/556.1
2011/0143811 A1* 6/2011 Rodriguez .................. 455/556.1
2011/0145068 A1* 6/2011 King et al. ................. 705/14.55

FOREIGN PATENT DOCUMENTS

JP           2001238266      8/2001
KR       1020060081000      7/2006
KR           100847002      7/2008
KR       1020090001831      1/2009

OTHER PUBLICATIONS

International Search Report & Written Opinion dated Apr. 6, 2012 for International Application No. PCT/US2011/054753.

* cited by examiner

Primary Examiner — Colleen A Hoar
(74) Attorney, Agent, or Firm — Fleit Gibbons Gutman Bongini Bianco PL; Jon A. Gibbons

(57) ABSTRACT

Disclosed is a novel system and process to provide an interactive environment for advertisers utilizing physical advertisement structures to provide their advertisements to users. Users are able to receive advertisement information associated with the advertisements on these structures along with additional information associated with the advertisements. This is also beneficial for the advertisers because this static form of advertising now becomes dynamic and interactive. Advertisers are now able to provide more detailed information regarding their products, services, etc. than what is normally available via an advertisement structure such as a billboard.

20 Claims, 18 Drawing Sheets

| USER ID 202 | IAE ID 206 | CONTACT ADDRESSES 210 | SAVED ADVERTISEMENTS 214 | OFFER DROP BOX 218 | ... |
|---|---|---|---|---|---|
| USER_A 208 | IAE_A | 555-123-456 USER_A@ EMAILXZY 212 | ADV_1 ADV_2 ... ADV_N | TXT VM 216 | ... 220 |
| ... | ... | ... | ... | ... | ... |
| ... | ... | ... | ... | ... | ... |
| ... | ... | ... | ... | ... | ... |
| USER_N | IAE_N | 555-234-5678 | N/A | TXT VIDEO | ... |

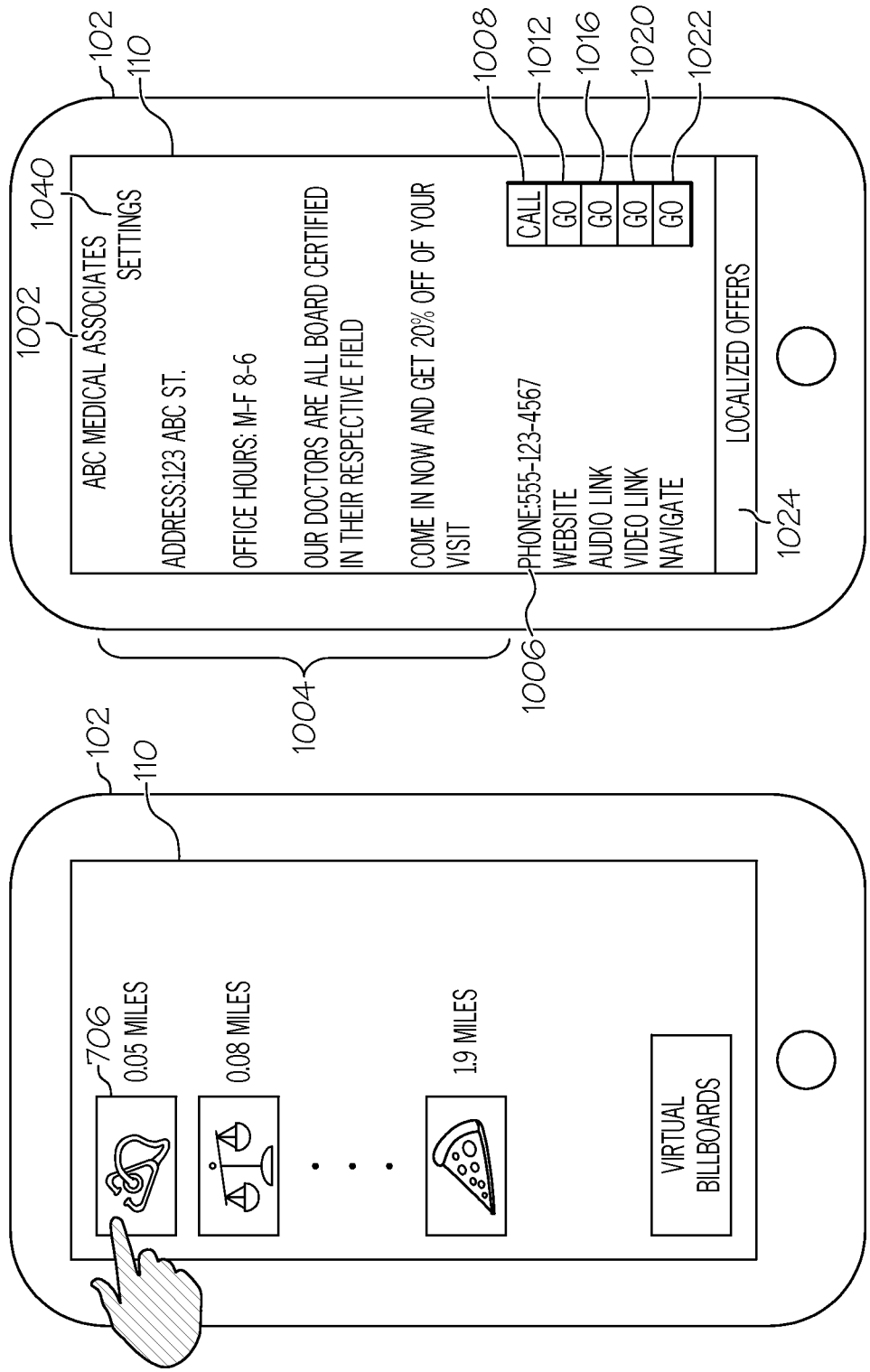

INTERACTIVE ADVERTISEMENT ENVIRONMENT

CROSS-REFERENCE TO RELATED APPLICATIONS

This application is based upon and claims priority from prior U.S. Provisional Patent Application No. 61/389,453, filed on Oct. 4, 2010, the entire disclosure of which is herein incorporated by reference.

BACKGROUND

The present invention generally relates to advertisement systems, and more particularly relates to an interactive advertisement system for wireless communication devices.

Physical advertisement structures such as billboards, posters, signs, or the like can be found virtually anywhere. Individuals generally encounter these types of advertisements when travelling in a vehicle. However, because an individual is usually concentrating on driving, conversing with other occupants of the vehicle, etc., the individual generally has a minimal amount of time to read an advertisement on a billboard. Therefore, these structural types of advertisements are not as effective as other types of advertisements. Moreover, it is difficult to get information related to physical advertisement structures only when the user knows the approximate geographic location of the sign.

SUMMARY OF THE INVENTION

Disclosed is a novel system and process to provide an interactive environment for advertisers utilizing physical advertisement structures to provide their advertisements to users. Users are able to receive advertisement information associated with the advertisements on these structures along with additional information associated with the advertisements. This is also beneficial for the advertisers because this static form of advertising now becomes dynamic and interactive. Advertisers are now able to provide more detailed information regarding their products, services, etc. than what is normally available via an advertisement structure such as a billboard.

In one example, an information processing system, such as a server provides an interactive advertising environment to a user of a wireless device. In this example, the server receives a request from a wireless device for a set of information associated with one or more physical advertisement structures presenting at least one advertisement. The server determines a current location of the wireless device. Next, the server identifies a set of physical advertisement structures within a given distance from the current location of the wireless device that has been determined. The server, then obtains a set of information associated with each physical advertisement structure in the set of physical advertisement structures and each advertisement currently being presented thereon. Finally the server sends the set of information to the wireless device.

In another example, a wireless device system and method is described for providing an interactive advertising environment to a user of a wireless device. In this example a request for a first set of information associated with one or more physical advertisement structures presenting at least one advertisement is received from a user of the wireless device. Next, the wireless device obtains a set of location information associated with a current location of the wireless device. The wireless device sends a query to an information processing system, such as a server, for the first set of information. In response, the wireless receives, from the information processing system, the first set of information. The wireless device displays one or more representations of a set of physical advertisement structures to the user via an interface. A selection a selection of at least one of the one or more representations from the user is received. A second set of information associated with advertisement structure corresponding to the representation that has been selected is displayed. The second set of information is based on the first set of information that has been received and is displayed to the user via the interface.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 2 is a table illustrating user profiles according to one example of the present invention;

FIG. 9 is block diagram illustrating one example of user selecting an advertisement structure widget being displayed in an interactive advertising environment on a wireless device according to one example of the present invention;

FIG. 10 is block diagram illustrating one example of displaying advertisement information associated with an advertisement structure in an interactive advertising environment on a wireless device according to one example of the present invention;

DETAILED DESCRIPTION

Figure 1:
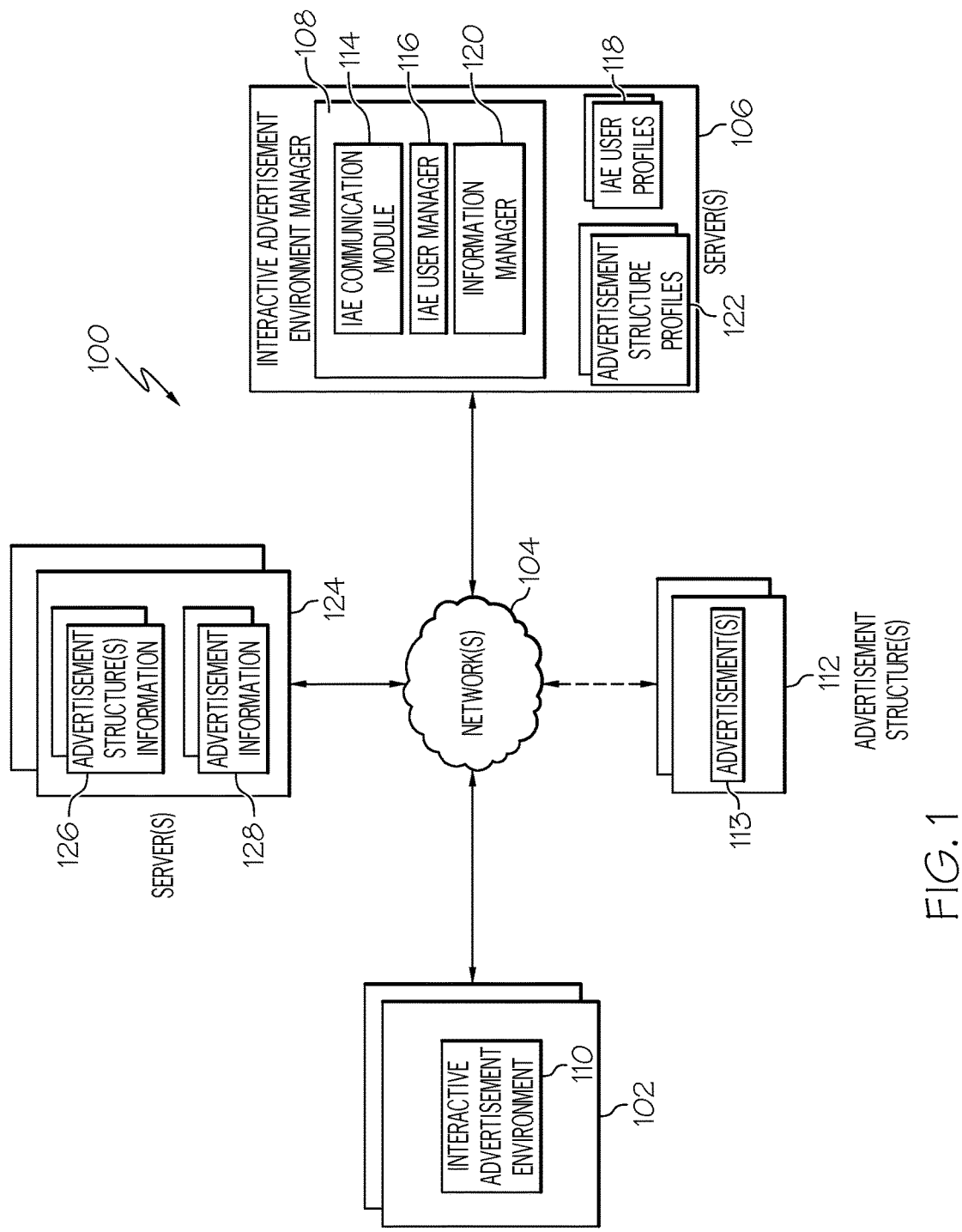
FIG. 1 is a block diagram illustrating one example of an operating environment for providing an interactive advertising environment according to one example of the present invention.

FIG. 1 shows one example of an operating environment 100 applicable to various embodiments of the present invention. The operating environment 100, in one example, comprises one or more wireless devices 102 communicatively coupled to one or more networks 104. One or more servers 106 comprising an Interactive Advertisement Environment Manager (IAEM) 108 are also communicatively coupled to the network 104. The wireless devices 102 are devices such as, but not limited to, a cellular telephone, a mobile phone, a smartphone, a wireless messaging device, a laptop/computer, a personal digital assistant, and other similar devices able to send/receive wireless data.

The network(s) 104, in one example, comprises one or more of a local area network, wide area network, the World Wide Web, wireless networks, wireless communication networks, and/or the like. With respect to a wireless communication network, this type of network can comprise a mobile phone network, a mobile text messaging device network, a pager network, or the like. Further, the communications standard of a wireless communication network can be Code Division Multiple Access (CDMA); Time Division Multiple Access (TDMA), Global System for Mobile Communications (GSM), General Packet Radio Service (GPRS), an Evolution Data Only (EV-DO), Universal Mobile Telecommunications System (UMTS), an Integrated Dispatch-Enhanced Network (iDEN), Frequency Division Multiple Access (FDMA), other IEEE 802.16 standards, Orthogonal Frequency Division Multiplexing (OFDM), Orthogonal Frequency Division Multiple Access (OFDMA), LTE, UMB, WiMax, or other technologies. Additionally, the wireless communications network can also comprise text messaging standards, for example, Short Message Service (SMS), Enhanced Messaging Service (EMS), Multimedia Messaging Service (MMS), or the like.

The wireless device(s) 102 comprises an Interactive Advertisement Environment (IAE) 110 that communicates with the IAEM 108 for obtaining and presenting advertisement and other information associated with an advertisement structure 112 of interest. An advertisement structure 112, in one example, is any type of structure that presents advertisements 113 to an audience. Examples of physical advertisement structures 112 are billboards, posters, signs, vehicles such as buses and taxis, or the like. The billboards may be advertisement for an event such as weather and traffic and variable message signs on highways. For example, a variable-message sign notifying of a "Silver Alert" about missing persons is an advertisement structure. A dashed-line is shown wired or wirelessly connecting the physical advertisement structures 113 to a network such as a variable message sign. However, in other examples, the physical advertising structures are traditional billboards and posters without any connection to the sign.

The IAE 110, in one example, can be an application residing on the wireless device 102, a web service, a web application, a mashup, or the like. The IAE 110 allows a user to obtain, save, and track information associated with advertisements 113 residing on physical advertisement structures 112. For example, a user of the device 102 can be driving and see a billboard of interest (i.e., advertisement structure 112). The user is able to select an option in the IAE 110 that indicates that the user is requesting additional information on a billboard that he/she just passed. The IAE 110 can obtain the device's 102 current position via a Global Positioning Satellite module (or by any other form of location determination method) and sends this information to the IAEM 108. Alternatively, the IAEM 108 can receive an instruction from the IAE 110 to determine the current position of device 102. The IAEM 108 then utilizes this information to identify physical advertisement structures 112 (e.g., billboards) within a given radius of the device's current position. The IAEM 108 then returns a set of information associated with one or more identified physical advertisement structures 112, their advertisements 113, and/or additional information as provided by an advertiser to the IAE 110 at the device 102. The IAE 110 then presents this information to the user. The IAE 110 is discussed in greater detail below.

In one example, the IAEM 108 comprises an IAE communication module 114 that manages sending/receiving information to/from the IAE 110. The IAEM 108 also comprises an IAE user manager 116 that, among other things, identifies and verifies the users of the IAE 110. The IAE user manager 116 also maintains one or more IAE user profiles 118 associated with the IAE users. The IAEM 108 further comprises an information manager 120. The information manager 120 manages advertisement structure profiles 122 and their related information. These profiles 122 are associated with the physical advertisement structures 112, the advertisements 113 displayed on the structures 112, and other information associated with the advertisements 113 that the advertisers want presented to a user.

In one example, the IAEM 108 obtains this information for the physical advertisement structures profiles 122 from one or more servers 124 communicatively coupled to the network 104. For example, FIG. 1 shows one or more servers 124 that comprise advertisement structure information 126 such as, but not limited to, structure location, structure type (e.g., static billboard, dynamic billboard, sign, poster, etc.), and the like. These servers 124 can also include advertisement information 128 associated with the advertisements currently displayed on the physical advertisement structures 112. The IAEM 108 can periodically retrieve this information 126, 128 or at least a portion of this information and store it locally in the advertisement structure profiles 122. Alternatively, this information 126, 128 can be retrieved in response to a request from the IAE 110.

The IAEM, IAE user profiles 118, and advertisement structure profiles 122 are discussed in greater detail below. It should be noted that one or more of the IAEM 108, its components, the IAE user profiles 118, and the advertisement structure profiles 122 can reside in one or more servers as compared to a single sever, as shown in FIG. 1. Also, one or more of the IAEM 108 components can reside outside of the IAEM 108 as well.

As discussed above, physical advertisement structures generally only provide advertisers the ability to briefly convey their advertisements. Potential customers usually do not have a great deal of time to look at these types of advertisements and many times miss the advertisements. Various examples of the present invention overcome these and other deficiencies by providing an interactive environment for advertisers to provide their advertisements to users.

As will be discussed in greater detail below, if a user is interested in an advertisement that they have seen or may have missed on a structure, the IAE 110 allows the users to obtain and save this advertisement information along with additional information associated with the advertisements. This is also beneficial for the advertisers because this static form of advertising now becomes dynamic and interactive. Advertisers are now able to provide more detailed information regarding their products, services, etc. than what is normally available via an advertisement structure such as a billboard.

As discussed above, the IAEM 108, via the IAE user manager 116, maintains one or more user profiles 118 for each user associated with an IAE 110. For example, if the IAE 110 is an application, the IAEM 108 can store "registration" information such as, but not limited to, a unique ID associated with the application, device, and/or user when the user downloads the application. This allows the IAEM 108 to identify a user and verify that the user is authorized to send/receive information to/from the IAEM 108. Also, the IAEM 108 can save a unique address associated with the device (e.g., phone number) or user (e.g., email address) so the IAEM 108 can send information to the device via other mechanisms other than the application. Alternatively, the user can manually enter this "registration" information via the application (IAE 110) after it has been installed on the device 102. If the IAE 110 is a web service, web application, or provided through a website, the user can enter the "registration" information via the web service, web application, or through the website.

FIG. 2 shows one example of user profiles 116. It should be noted that each row in the table 200 is a user profile 116. However, other formats for storing profiles/records can be used as well. In particular, FIG. 2 shows a table 200 comprising a plurality of columns. A first column 202, labeled "User ID", comprises entries that uniquely identify a user. For example, one entry 204 under this column 202 comprises a unique identifier of "USER_A". The IAEM 108 can use this information to verify that a user is registered with the IAEM 108 and/or to identify the user profile 116 associated with the user. A second column 206, labeled IAE ID", comprises entries that uniquely identify a given IAE 110. For example, an entry 208 under this column 206 uniquely identifies an IAE 110 as "IAE_A". The IAEM 108 can use this information to verify the authenticity of an IAE 110, to send information to the IAEM 108, or the like.

A third column 210, labeled "Contact Addresses", comprises entries that include one or more addresses such as, but not limited to, phone numbers, email address, or the like that are associated with the user or the device 102. For example, an entry 212 under this column 210 includes a phone number associated with USER_A's device 102 and an email address associated with USER_A. The IAEM 108 can use this information, for example, to send information to the user via another mechanism in addition to the IAE 110. Also, the IAEM 108, with the permission of the user, can send this information to an advertiser associated with an advertisement that the user is interested in. The advertiser can then send additional information, coupons, customized offers, or the like to the user via these contact information and/or the IAE 110.

A fourth column 214, labeled "Saved Advertisements", includes entries that include advertisement information that a user has saved. For example, when a user is presented with advertisement information via the IAE 110, the user is able to save this information or at least an identifier associated with this advertisement in his/her user profile at the IAEM server 106. As shown in FIG. 2, USER_A has saved information associated with advertisements ADV_1, ADV_2, and ADV_N. If an identifier is saved, the IAEM 108 uses this identifier to retrieve the advertisement information 126 (or 128) to present to the user when requested. It should be noted that this information or identifier can also be stored on the wireless device 102 as well. It should also be noted that one or more columns can be added and/or deleted from the table 200 as well.

The fifth column 218 "Offer Drop Box" is used in conjunction with the "Localized Offers" in column 350 of FIG. 3 described below. Entries 220 include different formats of multimedia communication including text, sound/voice, and video. In this example, the drop box is a separate area on the IAE of the user device that allows text, voicemail, and video to be reviewed by the user without the need to open another application, such as an email or messaging client, on the user device. Instead in this example, this drop box is a universal in-box for all offers and advertisements, whether pulled by the user or pushed by the advertisers. In other examples, the IAE uses the messaging and e-mail clients already installed on a device for localized offers.

Figure 3:
FIG. 3 is a table illustrating advertisement structure profiles according to one example of the present invention.

In addition to user profiles 116, the IAEM 108, via the information manager 120, also maintains advertisement structure profiles 122, as shown in FIG. 3. Advertisement structure profiles 122, in one example, maintain information associated with an advertisement structure 112. This information, in one example, is retrieved by the information manager 120 from the advertisement structure information 126 and/or advertisement information 128 residing at one or more servers 124. Each advertisement structure profile 122 is associated with at least one advertisement structure 112.

In particular, FIG. 3 shows a table 300 comprising a plurality of columns and rows. It should be noted that each row in the table is an advertisement structure profile 122. However, other formats for storing profiles/records can be used as well. A first column 302, labeled "Board ID", comprises entries that uniquely identify an advertisement structure such as, but not limited to, a billboard. For example, an entry 304 under this column 302 uniquely identifies a billboard associated with this particular profile 122 as "BRD_A". The IAEM 108 can use this information to, among other things, identify a profile 122 associated with a given advertisement structure 112.

A second column 306, labeled "Customer", comprises entries that uniquely identify an advertiser associated with a current advertisement 113 on the given advertisement structure 112. For example, an entry 308 under this column 306 indicates that an advertiser uniquely identified as CUST_A is associated with an advertisement displayed on the structure identified as BRD_A. The IAEM 108 can use this information to, among other things, identify contact information associated with the advertiser; additional information such as, but not limited to, more detailed advertisement information, coupon information, customized offers for a given user, or the like that the advertiser wants to present to a user; and other types of information.

A third column 310 and a fourth column 314, labeled "Latitude" and "Longitude", respectively, comprise entries with location information associated with an advertisement structure 112. For example, an entry 312 under the "Latitude" column 310 shows that the advertisement structure BRD_A has latitudinal coordinates of "26.4195". An entry 316 under the "Longitude" column 314 shows that the advertisement structure BRD_A has longitudinal coordinates of "−80.0935". It should be noted that altitude information can also be included in the profile 122 as well. The IAEM 108 uses this information to, among other things, identify physical advertisement structures associated with a profile 122 that are within a given distance from a user of the IAE 110. Altitude information allows the IAEM 108 to identify a set physical advertisement structure(s) and their advertisements within a multi-story building such as a shopping center. For example, a user can be on the fifth floor of the shopping center. The IAEM 108 is then able to identify the physical advertisement structures and their advertisements that are on the fifth floor of the shopping center.

Also, the IAEM 108 can use this information to identify a given number of physical advertisement structures 112 of interest to a user of the IAE 110. For example, a user can send location information such as an address, an intersection, landmark, GPS information, or the like to the IAEM 108. The IAEM 108 can then analyze the profiles 122 and this location information within the profiles 122 to identify physical advertisement structures and their advertisements that correspond to the location information received from the user.

A fifth column 318, labeled "Video Link", comprises entries that include a link such as a web link to one or more videos associated with a current advertisement on the advertisement structure 112. For example, an entry 320 under this column 318 includes a video link "VL_A" for an advertisement currently on advertisement structure BRD_A. The IAEM 108 is able to send this video link to the user via the IAE 110. This allows advertisers to provide additional information to the user other than what is currently being displayed on the advertisement structure 112. It should be noted that the IAEM 108 can also send the actual video file to the IAE 110 as compared to only sending the link.

A sixth column 322, labeled "Audio Link", comprises entries that also include a link such as a web link to one or more audio files associated with a current advertisement on the advertisement structure 112. For example, an entry 324 under this column 322 includes an audio link "AL_A" for an advertisement currently on advertisement structure BRD_A. The IAEM 108 is able to send this audio link to the user via the IAE 110. This allows advertisers to provide additional information to the user other than what is currently being displayed on the advertisement structure 112. It should be noted that the IAEM 108 can also send the actual audio file to the IAE 110 as compared to only sending the link.

A seventh column 326, labeled "Banner Picture", comprises entries with pictures of current advertisements on the advertisement structure. It should be noted that because an advertisement structure generally displays a picture with an advertisement 113, these entries can comprise the actual advertisements 113 themselves. For example, an entry 328 under this column 326 comprises "PIC_A" that is associated with an advertisement currently being displayed on advertisement structure BRD_A. In one example, the IAEM 108 can send this picture, which comprises the actual advertisement 113 on the advertisement structure 112, to the IAE 110 so that the user can view what is currently being displayed on the structure.

In another example, the IAEM 108 can perform feature recognition operations on the picture to identify an advertisement of interest to the user. For example, a user can take a photograph or video of an advertisement structure 112 with its advertisement. The user can then send this information to the IAEM 108 to receive additional information about the advertisement. If the photograph/video file received from the user does not include location information (e.g., GPS coordinates tagged to the file) the IAEM 108 can compare the file received from the user and to the Banner Picture information in the profile 122 to identify which advertisement structure the user is interested in.

An eighth column 330, labeled "Category", comprises entries that indicate an information category associated with an advertisement on the advertisement structure 112. For example, an entry 332 under this column 330 indicates that the advertisement on the advertisement structure BRD_A is associated with insurance. The IAEM 108, in one example, can send this information to the IAE 110 so that the user can quickly identify the type of information associated with a given advertisement on the structure 112.

A ninth column 334, labeled "Message", comprises entries that include additional information that an advertiser wants sent to a user via the IAE 110. For example, an entry 336 under this column 334, comprises a message "MESSG_A". This message can be any additional information that the advertiser wants sent to a user that they could not convey on the advertisement structure. This allows for the advertisers to provide more detailed information to users than what is normally available on an advertisement structure. Also, these messages can comprise coupons, customized offers for the user, or the like.

A tenth column 338, labeled "Link", comprises entries that include additional links such as web links that are associated with an advertiser. For example, an entry 340 under this column 338 comprises a link of "URL_A". These links can be, for example, links to websites associated with the advertisers. The IAEM 108 sends these links to the users via the IAE 110. An eleventh column 342, labeled "Phone Number", comprises entries that include phone numbers associated with an advertiser. For example, an entry 344 under this column 342 includes a phone associated with an advertiser that currently has an advertisement on the advertisement structure BRD_A. The IAEM 108 can send this information to the user via the IAE 110. The user can then contact the advertiser to obtain additional information associated with an advertisement.

The twelfth column 346 "Navigation", comprises entries for links with third-party navigation systems. For example, an entry 348 for NAV_1 is OnStar®, NAV_2 is Verizon® Navigation, and NAV_3 is Google® Navigation, and others. This entry enables a user of the IAEM to navigate to an address associated with the physical advertisement structure, such as a street address of a store using a third-party navigation service. The IAEM provides a choice of third-party navigation services based on available navigation services for a given wireless device.

The thirteenth column 350 "Localized Offers" is a set of offers that are localized to the user of the wireless device. These offers are typically geographically based, such as to a county or zip code. However, in other embodiments, the geography can be a street, or even an area within a physical store. For example, entry 352 is LOC_1 advertisement or offer for a restaurant, LOC_2 advertisement for car service center, and LOC_3 advertisement for a product. The fourteenth column 354 "Localized Time Period" is used in conjunction with the "Localized Offers" of column 350. In this example, entry 356 shows that the LOC_1 advertisement runs for an hour, LOC_2 runs for a week, and LOC_3 runs for 1 day. These time periods are settable by the advertisers. In another example, the user requests from the IAEM localized offers for a specific time period. The user may set a time period based on being within a given geographic area for a short period of time. For example, the user will be in the current zip code for the next hour and is looking for restaurants. In another example, the user may be on vacation in an area for a week and interested in a longer time period for advertisements for food. User initiated time periods and categories allows the user to minimize the amount of irrelevant information, such as offers for food near Disney World® in Orlando after the user returns home from vacation. The IAEM 108 enables localized offers to be "pulled" for their needs and also allows advertisers to "push" offers to the users.

The fifteenth column 358 "Text-To-Speech" comprises entries for links with third-party text to speech solutions. For example, an entry 360 for TTS_1 is Dragon® text-to-speech, TTS_2 is IBM® text-to-speech, and NAV_3 is Google® text-to-speech, and others. This entry enables a user of the IAEM to have the information associated with the physical advertisement structure being received by the wireless device to read aloud using text-to-speech technology. The IAEM provides a choice of third-party text-to-speech services based on available text-to-speech services for a given wireless device. Likewise, the sixteenth column 362 "Voice Recognition" comprises entries for links with third-party voice recognition solutions. For example, an entry 364 for VX_1 is Dragon® voice recognition and VX_2 is Google® voice recognition, and others. This entry enables a user of the IAEM to send requests to IAEM using voice rather than typing. User's requests, such as localized offers, in this example are made by voice. The user could speak "send all the offers for American food in Fort Lauderdale for the next 3 hours." The voice recognition solution converts the user's speech on the wireless device to a text-based message to the IAEM. As with Navigation and Text-To-Speech, the IAEM provides a choice of third-party solutions based on available software services for a given wireless device.

The seventeenth column 366 "National Language" comprises entries for presenting the information through the IAE to the user in different national languages such as English, French, Spanish, Portuguese, Japanese, Chinese, German, Hindi and others. Entry 368 is for English and Spanish. In this embodiment, the information is available if multiple languages and the regional preference including currency formats, and date formats, are customized to the user. The National Language preferences can be set by advertisers, the user or both. These preferences, in another example, set preferences for the language to use with Text-To-Speech in column 358 and/or Voice Recognition language in column 362.

The eighteenth column 370 "Social Media" comprises entries for posting information presented by the IAE to social media sites. An entry 372 for Site_1 is for Facebook®, Site_2 is for Twitter® and Site_3 for Linked-In® and others. In this embodiment, the information is available to be shared with social media sites with the IAE.

The nineteenth column 374 "Content Layout" comprises entries for use by advertisers to set a look and feel of an advertisement campaign. For example, an advertisement for a chain of restaurants may want the consistent placement of logos, consistent use of fonts and content to be associated with multiple physical advertisement structures. This template to posting information is presented by the IAE. An entry 376 for Template_1 is for a first preferred layout of information and Template_2 is for a second preferred layout of information. In this embodiment, the information is formatted according to the template selected. Various commercial and proprietary tools may be used for designing, editing and publishing information. These tools are further described below with reference to FIG. 18.

It should be noted that the fields in table 200 of FIG. 2 and table 300 of FIG. 3 are examples only. Entries from table 200 may be duplicated in table 300 and vice versa. Moreover, certain entries from one table may be moved to another table within the examples described.

It should be noted that some physical advertisement structures 112 are dynamic. In other words, these types of physical advertisement structures change the advertisement after a given interval of time. For example, a digital (or mechanical) billboard rotates through a set of advertisements over a short period of time. In this situation, an advertisement structure can have multiple profiles 112, one for each advertisement. Alternatively, the advertisement structure can have multiple entries under a column, one for each of the advertisements. Other forms of record management can be implemented as well. Also, the advertisements on static advertisement structure can be updated either when an advertiser changes the advertisement or a new advertiser leases the advertisement structure. In this situation, the IAEM 108, in one example, updates the entries within a profile 122 accordingly. In other words, a new profile does not need to be created.

Also, physical advertisement structures 112 can be mobile. For example, a bus, a train, or taxi, or other vehicles can display advertisements 113. Therefore, in addition to latitude, longitude, and altitude information, other information such as bus number and/or route information, taxi number, or the like can be included to identify the advertisement structure 112 so that advertisement information for the advertisement(s) 113 on these structure types can be obtained and sent to the IAE 110.

A more detailed discussion of a user interacting with the IAE 110 and obtaining information from the IAEM 108 is now provided with respect to FIGS. 4-16. It should be noted that the IAE 110 in the following examples is an application residing on the wireless device 102. It should be noted that this is only example of the IAE 110. As discussed above, the IAE 110 can also be a web service, web application, mashup, or the like.

Figure 4:
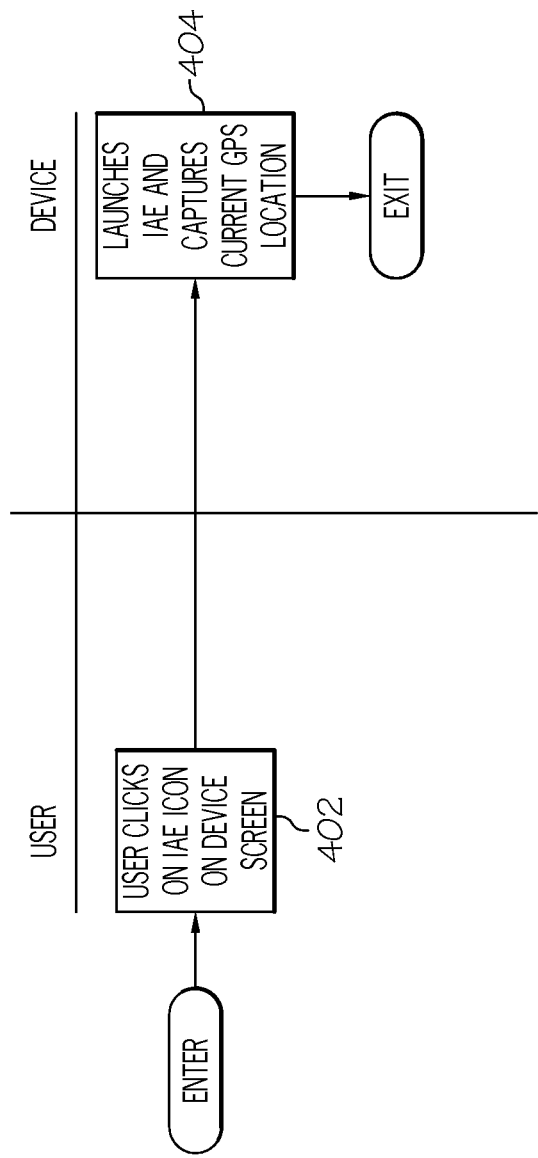
FIG. 4 is an operational flow diagram illustrating one process of a user initializing an interactive advertising environment (IAE) on a wireless device according to one example of the present invention.
Figure 5:
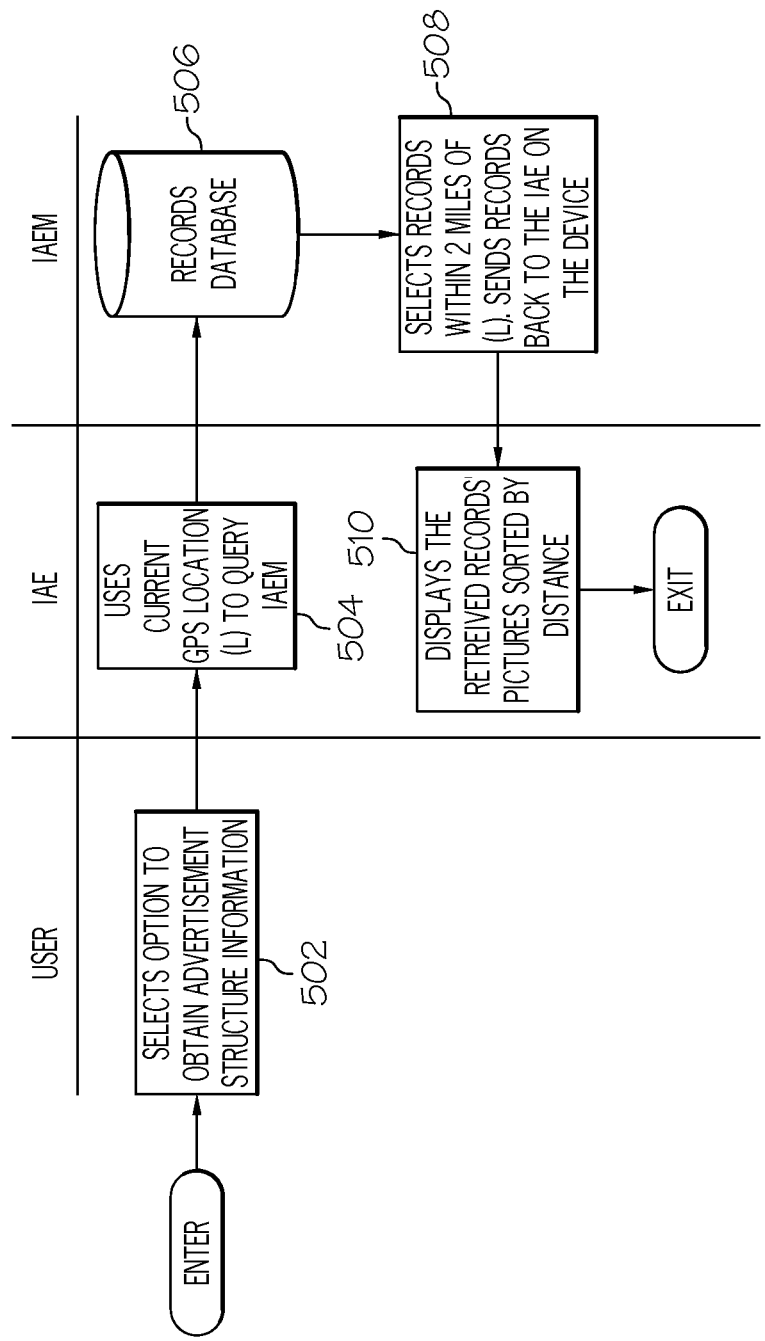
FIG. 5 is an operational flow diagram illustrating one process of retrieving advertising information associated with an advertisement structure(s) within a given distance from a wireless device of a user according to one example of the present invention.

FIG. 4 shows one example of initializing the IAE 110 on the wireless device 102. For example, a user, at step 402, selects a widget corresponding to the IAE 110 on the device 102. The device 102, at step 404, launches the IAE 110 and captures current GPS information for the device 102. However, it should be noted that the IAE 110 can be initialized and the GPS information is not captured until the user selects an option that instructs the device 102 to capture the GPS information. Once the IAE 110 is running on the wireless device 102, the user is able to obtain information associated with either specific physical advertisement structures of interest or with a number of structures that are within a given radius of the user's device 102. For example, as shown in FIG. 5, the user, at step 502, selects an option in the IAE 110 for obtaining information associated with nearby physical advertisement structures 112. The IAE 110, in response to this option being selected, utilizes the communication hardware and software of the device 102 to, at step 504, send a query comprising the GPS location information of the device 102 to the IAEM 108. It should be noted that depending on how the user has configured the IAE 110, the IAE 110 can also automatically send this query once the user initializes the IAE 110 during the process of FIG. 4.

The IAEM 108, via the IAE communication module 114, receives the query. It should be noted that the query can also comprise user and/or device identifier information. The IAEM 108, via the IAE user manager 116, uses this identifier information to analyze the IAE user profiles 116 to verify and/or authorize the user. For example, the IAEM 108 can compare the received identifier to the identifier(s) within the user profiles 116 to identify a match, where a match indicates that the user/device is verified/authenticated.

Once the IAEM 108 received the query, the IAEM 108, via the information manager 120, at step 506, analyzes the advertisement structure profiles 122 to identify a set of physical advertisement structures within a given radius of the user's device 102. For example, the IAEM 108 compares the GPS information within the query to the latitude, longitude, and optionally altitude information of physical advertisement structures in the advertisement structure profiles 122. Based on this comparison, the IAEM 108 can identify a set of physical advertisement structures within a given radius of the user. The IAEM 108, at step 508, then retrieves information within the profiles 122 associated with the set of physical advertisement structures and sends this information to the IAE 110. The information retrieved can be the "Board ID", "Banner Picture", "Link", "Phone Number", "Video Link", "Audio Link", "Message", and "Category" information discussed above with respect to FIG. 3. However, other types of information can be sent as well.

Figure 6:
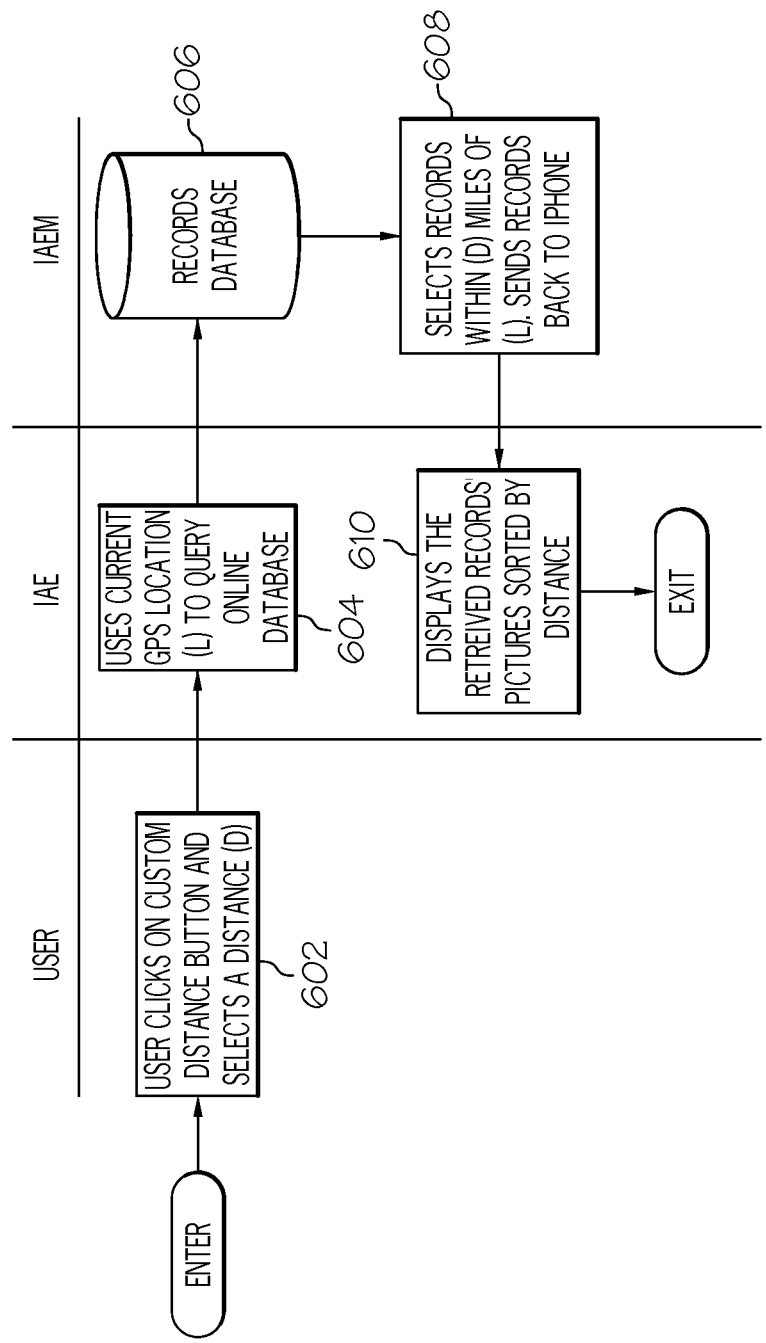
FIG. 6 is an operational flow diagram illustrating another process of retrieving advertising information associated with an advertisement structure(s) based on one or more given criteria of a user according to one example of the present invention.

It should be noted that the radius discussed above can be predefined by the IAEM 108 or can be set by the user via the IAE 110. For example, FIG. 6 shows that the user, at step 602, selects an option within the IAE 110 and defines a custom distance/radius. The IAE 110, in response to this option being selected and the distance/radius information being entered sends a query comprising the GPS location information of the device 102 and the distance/radius information to the IAEM 108 at step 604. The IAEM 108 receives the query and analyzes the advertisement structure profiles 122 to identify a set of physical advertisement structures 112 within the distance/radius set by the user, at step 606, similar to that discussed above with respect to FIG. 5. The IAEM 108, at step 608, then retrieves information within the profiles 122 associated with the set of physical advertisement structures 112 and sends this information to the IAE 110, as discussed above. The IAE 110, at step 610, receives the information sent from the IAEM 108 and displays the information to the user. It should be noted that other criteria besides a given radius can also be used. For example, searches for physical advertisement structures can be based on categories of advertisements, age of advertisements, or the like.

Figure 7:
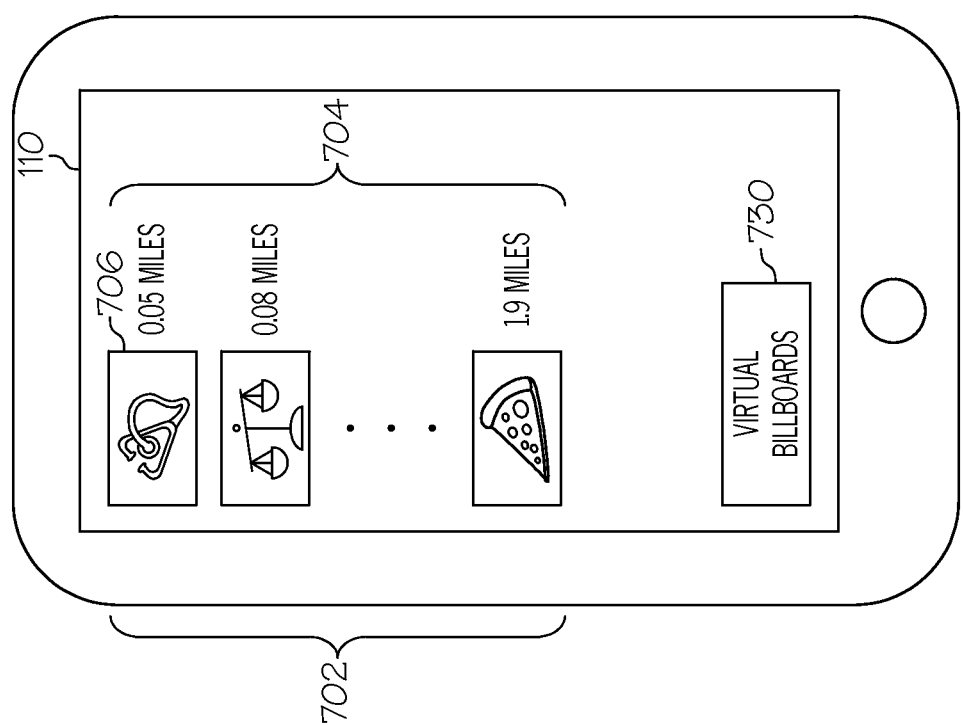
FIG. 7 is block diagram illustrating one example of displaying advertisement structure information to a user via an interactive advertising environment on a wireless device according to one example of the present invention.

FIG. 7 shows one example of the IAE 110 displaying a portion of the received information to the user via the IAE 110. In particular, FIG. 7 shows the IAE 110 on the device 112 displaying a set physical advertisement structure widgets (e.g., pictures) 702 to the user. The physical advertisement structure widgets 702, in one example, are the pictures under the "Banner Picture" column 326 of the profile 122 associated with the corresponding advertisement structure 112. As discussed above, this picture can be the exact same advertisement shown on the advertisement structure 112. In other words, the physical advertisement structure widgets 702 shown to the user are representations of the physical advertisement structures 112 with their current advertisements 113. A user is able to select a physical advertisement structure widget 702 to see an enlarged version of the picture/widget 702. In other words, the user is shown an enlarged version of the advertisement 113 currently on the advertisement structure 112.

The IAE 110, in one example, also displays distance information 704 to the user as well. This distance information 704 indicates how far from the user's location the advertisement structure 112 corresponding to the physical advertisement structure widgets 702 is. For example, FIG. 7 shows that an advertisement structure 112 corresponding to the first widget 706 is 0.05 miles from the user's location. These physical advertisement structure widgets 702 can be sorted in any order such as, by distance, by advertisement category, or the like. It should be noted that the IAE 110 can also display a map with the user's current location and location identifiers associated with each of the physical advertisement structures selected by the IAEM 108 to be displayed by the IAE 110. This allows the user to see the location of the physical advertisement structures 112 relative to his/her current position.

Figure 8:
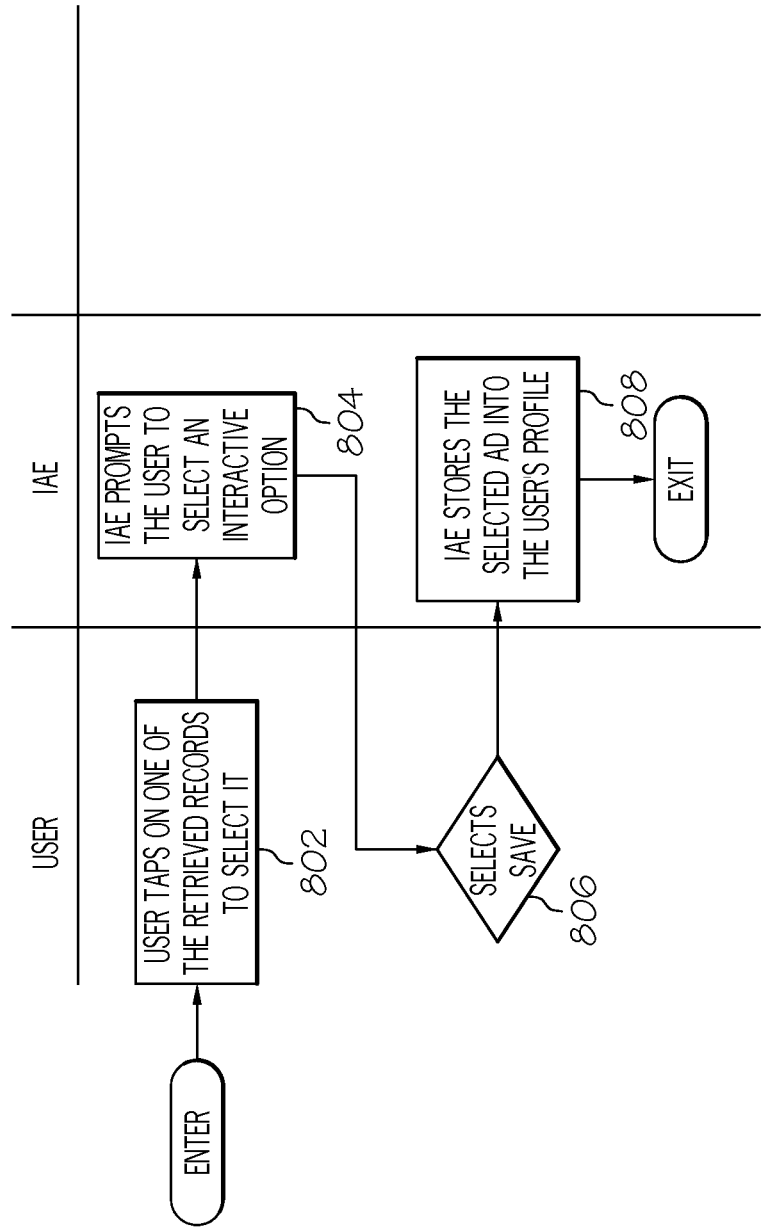
FIG. 8 is an operational flow diagram illustrating one process of a user interacting with an interactive advertising environment on a wireless device to save information associated with a physical advertisement structure according to one example of the present invention.

In one example, the user is able to select one or more of the physical advertisement structure widgets 702 to save the information associated therewith to the user profile 116, as discussed above with respect to FIG. 2. FIG. 8 shows one example of this process. In particular, FIG. 8 shows that a user, a step 802, selects one of the physical advertisement structure widgets 702 displayed on the IAE 110. The IAE 110, at step 804, prompts the user to select one or more actions. For example, a list of actions can include saving the information to user's profile 122, deleting the selected picture/widget 702 from the list, or the like. The type of information saved can be any of the "Board ID", "Banner Picture", "Link", "Phone Number", "Video Link", "Audio Link", "Message", and "Category" information discussed above with respect to FIG. 3 or any additional information as well.

Also shown is a "virtual billboard" 730 selection. This enables user to easily receive information regarding other informational sources such as local traffic, weather, news, and other widgets customized to their current location. Unlike other applications, the customizations are done automatically based on the location of the wireless device. Therefore, the user looks at the IAEM as the "Go To Place For Commuters" for information about signs, public service announcements, weather, traffic, and local news.

In the example of FIG. 8, the user, at step 806, via the IAE 110 selects an option to save the information associated with the currently selected physical advertisement structure widget 702. The IAE 110, at step 808, then instructs the IAEM 108 to store the information associated with the advertisement structure 112 and its advertisement(s) 113 in the user profile 116 and/or the IAE 110 stores this information locally on the user's device 102.

In another example, a user selects one of the physical advertisement structure widgets 706, as shown in FIG. 9. The IAE 110 then displays various information associated with an advertisement 113 currently displayed on the advertisement structure 112 corresponding to the selected widget 706, as shown in FIG. 10. For example, FIG. 10 shows the name 1002 of the advertiser. The information may be additional advertisement information such as store hours and locations and/or just repeat the information on the physical advertisement structure.

As discussed above, this information is maintained under the "Customer" column 302 in FIG. 3. The IAE 110, as shown in FIG. 10, also displays one or more messages 1004 to the user. As discussed above these messages 1004 are created by the advertiser. These messages are maintained under the "Message" column 334 discussed above with respect to FIG. 3. These messages can provide additional details related to the advertisement 112 currently displayed on the advertisement structure 112 or custom offers for the particular user. This allows advertisers to present a more detailed advertisement message to users than what can be displayed on an advertisement structure 112 by itself.

In addition to the messages 1004, the IAE 110 presents interactive information as well. For example, FIG. 10 shows that the advertiser's phone number 1006 is displayed along with a "Call" widget 1008. The user is able to select this "Call" widget 1008 to automatically initiate a call to this phone number 1006, as shown by process in FIG. 11. Alternatively, the phone number 1006 itself can be selectable for initiating the call and the "Call" widget is not required. The phone number information 1006 is maintained by the IAEM 108 in the advertiser structure profiles 112 under the "Phone Number" column 342, as shown in FIG. 3.

Figure 11:
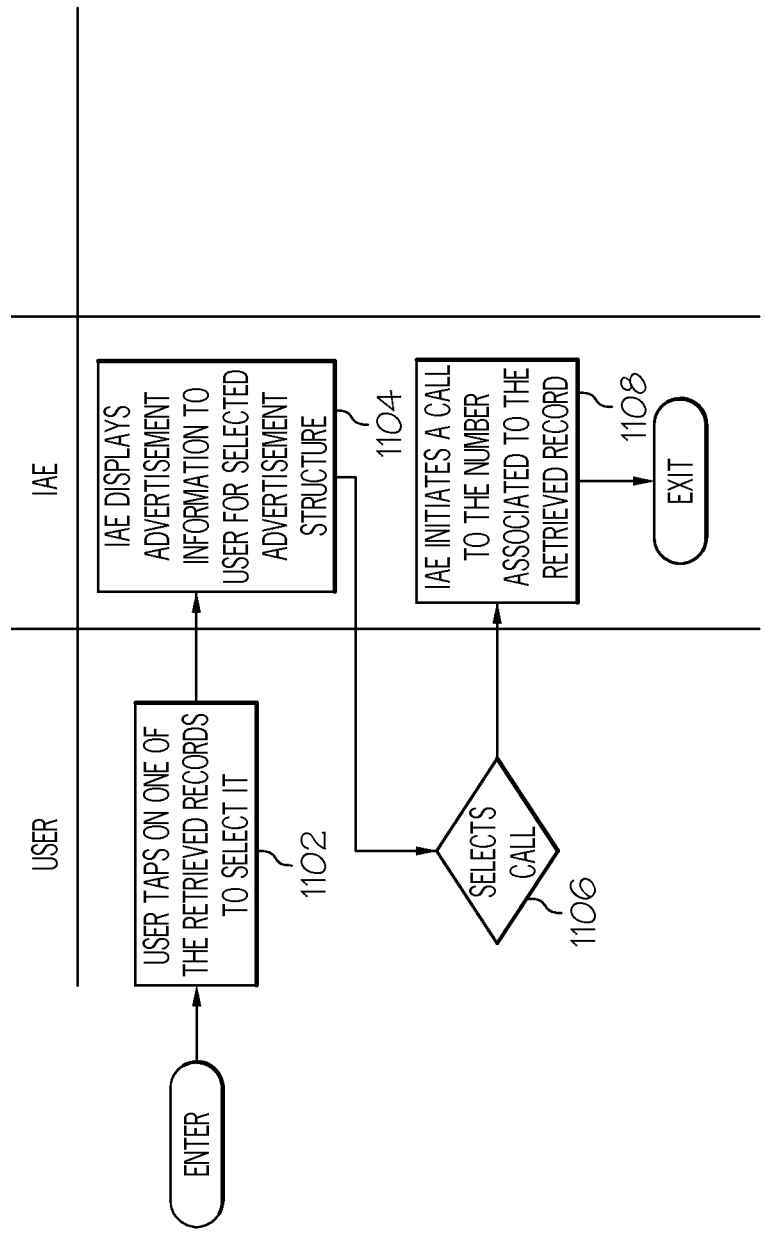
FIGS. 11-16 are operational flow diagrams illustrating various examples of a user interacting with the advertisement information of FIG. 10.

FIG. 11 shows that the user, in step 1102, selected the physical advertisement structure widget 706 displayed on the IAE 110. The IAE 110, at step 1104, displays advertisement information to the user for the selected advertisement structure 706, as shown in FIG. 10. The user, at step 1106, via the IAE 110 selects an option 1008 to call the advertiser phone number 1106. The IAEM 108, at step 810, then initiates a phone call to the displayed phone number 1006.

In another example, the IAE 110 presents a link 1010 to the advertiser's website along with a "Go" widget 1012. The user is able to select this "Go" widget 1012 to open, for example, a web browser and to automatically be brought to this website, as shown by the process in FIG. 12. It should be noted that the website link 1010 can be selectable as well and the "Go" widget is not required. The IAEM 108 maintains this website information 110 under the "Link" column 338 of the advertiser structure profiles 122, as shown in FIG. 3.

In yet another example, the IAE 110 presents a link 1022 to the call-up a navigation service under the Navigation column 346 of table 300. The user is able to select this "Navigate" widget 1022 to be given directions by a navigation service. Likewise, a settings button 1040 presents a link to set text-to-speech preferences under the "Text-To-Speech" column 362, voice recognition under the "Voice Reco" column 366, as well as language national language under the "National Language" column 374.

Moreover, a localized "drop box" 1024 is shown as a messaging area that corresponds to the universal in-box in column 358 of table 300. The "drop box" enables the user to receive both pushed advertising content as well as pull advertising content.

Figure 12:
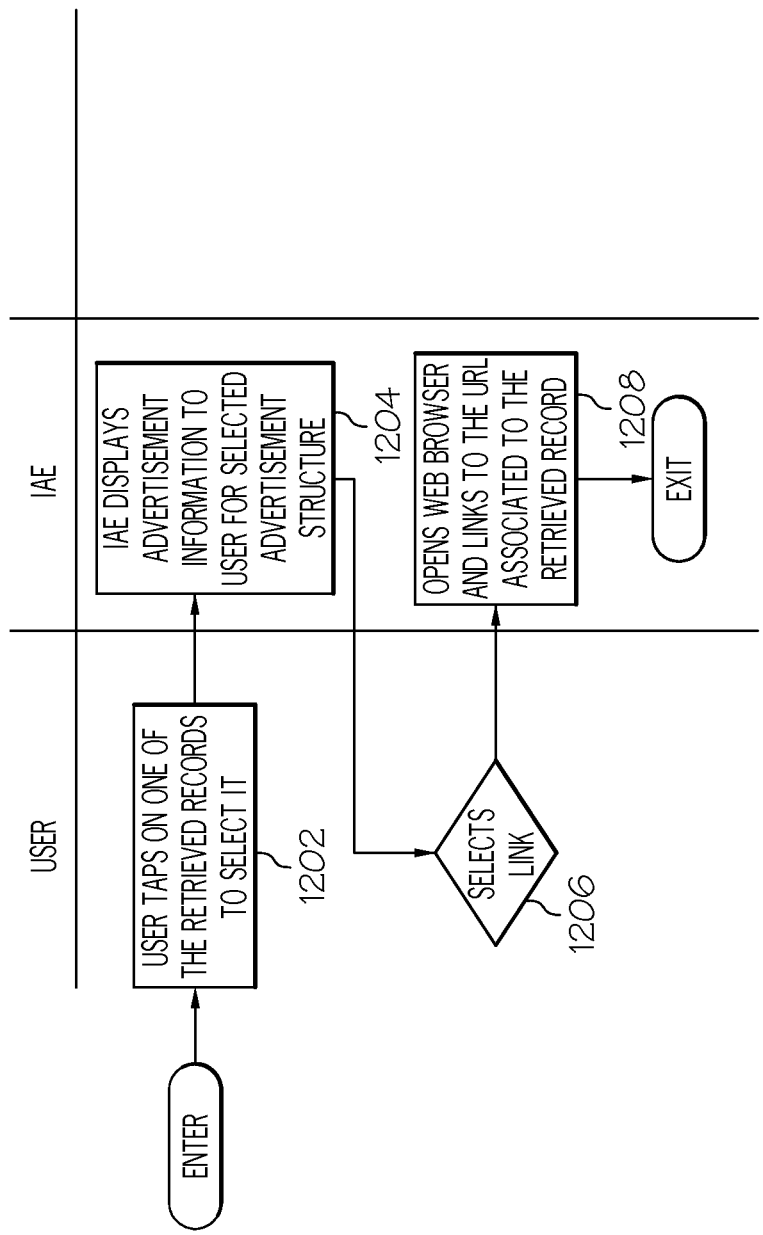

FIG. 12 shows that the user, in step 1202, selected the physical advertisement structure widget 706 displayed on the IAE 110. The IAE 110, at step 1204, displays advertisement information to the user for the selected advertisement structure 706, as shown in FIG. 10. The user, at step 1206, via the IAE 110 selects an option 1010 to display the listed website 1012. The IAE 110, at step 1208, then opens, for example, a browser and the website is displayed to the user.

FIG. 10 also shows that the IAE 110 can present an audio link 1014 to an audio file associated with the advertiser and a "Go" widget 1016. The user is able to select this "Go" widget 1016 to open, for example, a webpage comprising an audio file from the advertiser or to directly open the audio file, as shown by the process in FIG. 13. It should be noted that the audio link 1012 can be selectable as well and the "Go" widget 1016 is not required. The IAEM 108 maintains the audio link information 1014 is under the "Audio Link" column 324, as shown in FIG. 3.

Figure 13:
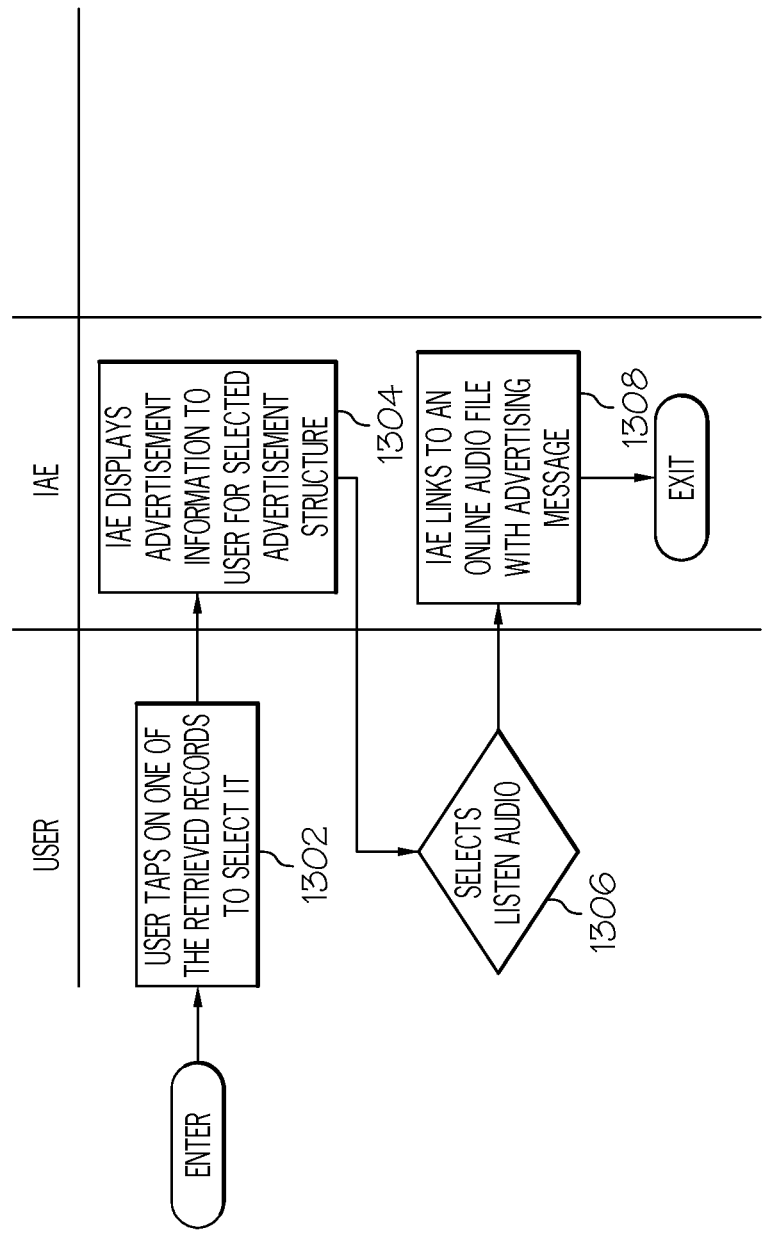

FIG. 13 shows that the user, at step 1302, selected the physical advertisement structure widget 706 displayed on the IAE 110. The IAE 110, at step 1304, displays advertisement information to the user for the selected advertisement structure 706, as shown in FIG. 10. The user, at step 1306, via the IAE 110 selects an option 1014 to open the audio file associated with the advertiser. The IAE 110, at step 1308, then opens the audio file and presents the audio to the user.

FIG. 10 further shows that the IAE 110 can present a video link 1018 associated with the advertiser along with a "Go" widget 1020. The user is able to select this "Go" widget 1020 to open, for example, a webpage comprising a video file from the advertiser or to directly open the video file, as shown by the process in FIG. 14. It should be noted that the video link 1018 can be selectable as well and the "Go" widget 1020 is not required. Also, the video link information 1018 is maintained under the "Video Link" column 318 of the advertisement structure profile 122, as shown in FIG. 3.

Figure 14:
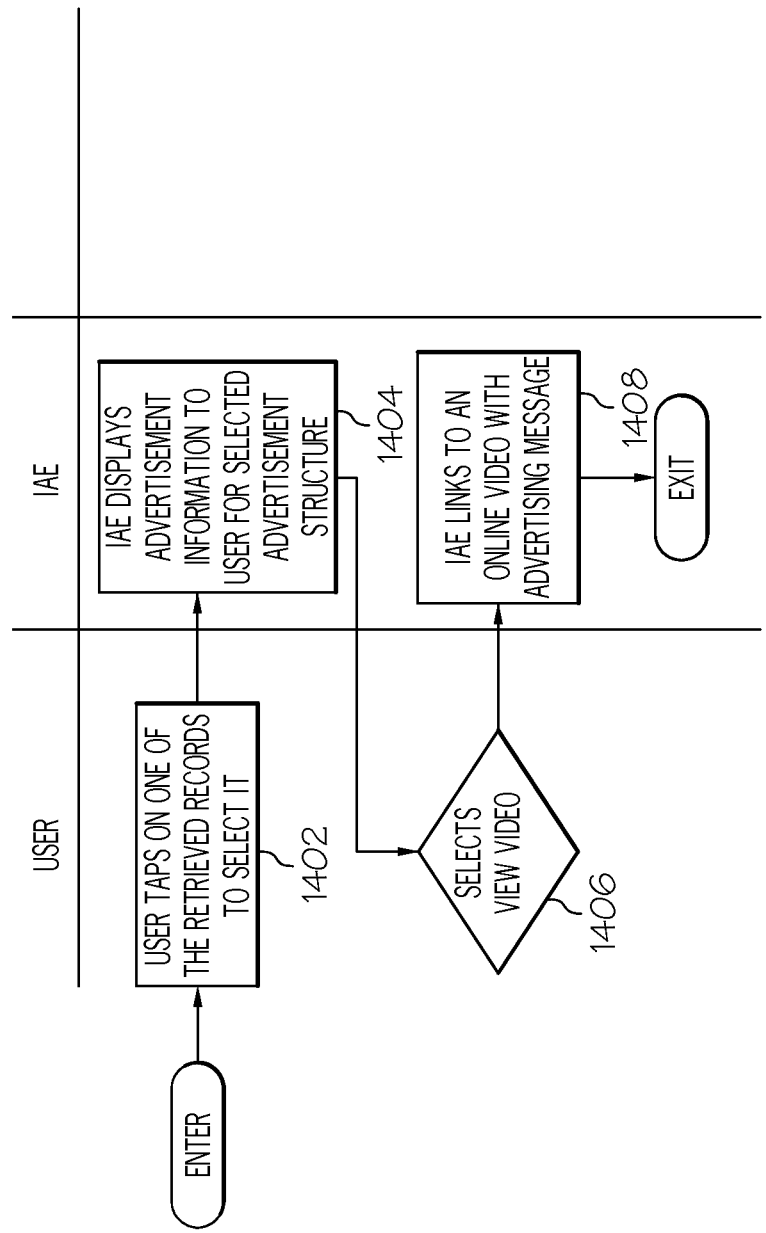

FIG. 14 shows that the user, at step 1402, selected the picture/widget 706 displayed on the IAE 110. The IAE 110, at step 1404, displays advertisement information to the user for the selected advertisement structure 706, as shown in FIG. 10. The user, at step 1406, via the IAE 110 selects an option 1014 to open the video file associated with the advertiser. The IAE 110, at step 1408, then opens the video file and presents the audio to the user.

Figure 15:
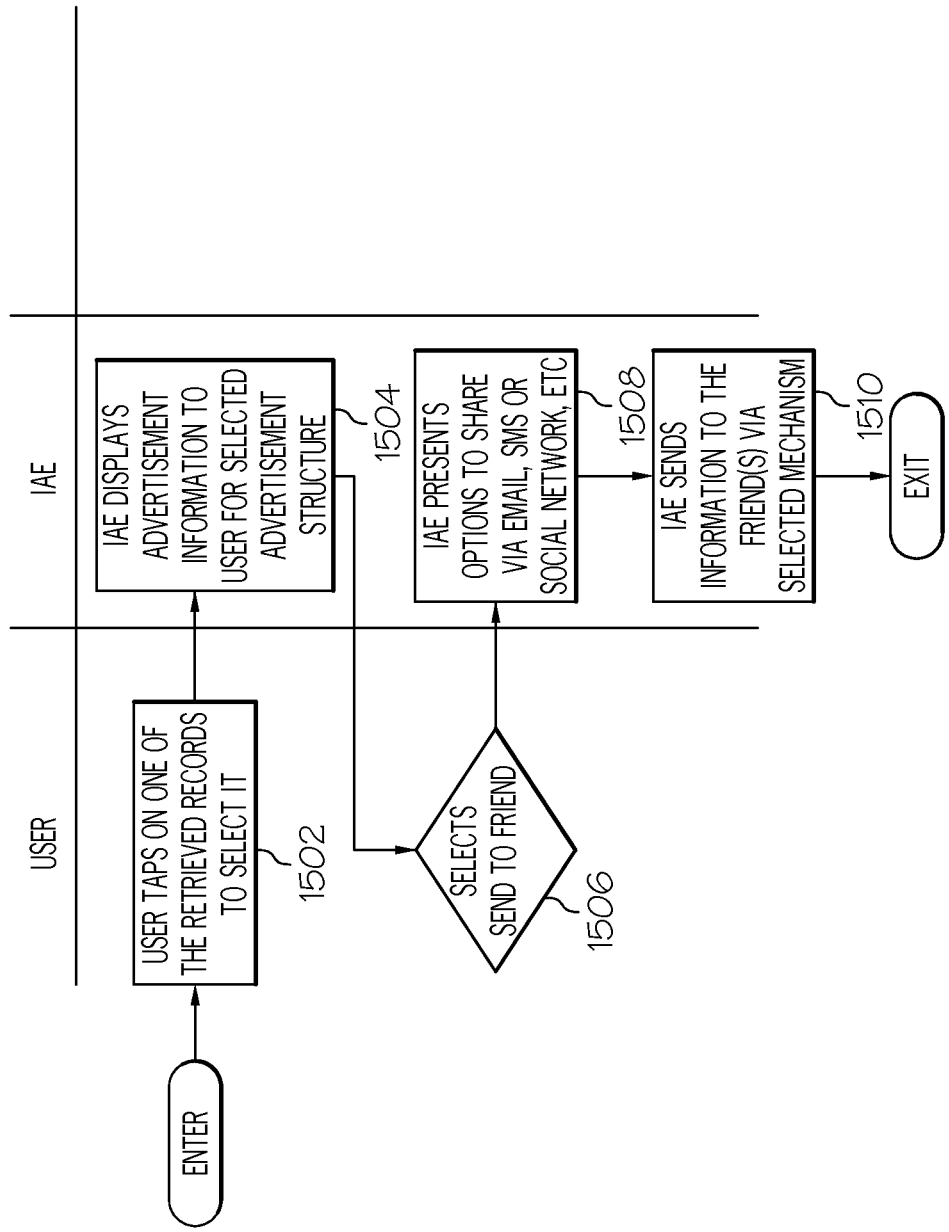

In addition to the information and options presented to the user as shown in FIG. 10 and discussed with respect to FIGS. 11-14, other options can also be presented to the user via the IAE 110. For example, FIG. 15 shows one process that allows a user to share the advertisement information of FIG. 10 with another user. The user, at step 1502, selects the physical advertisement structure widget 706 displayed on the IAE 110. The IAE 110, at step 1504, displays advertisement information to the user for the selected advertisement structure 706, as shown in FIG. 10. The user, at step 1506, via the IAE 110 selects an option to share the information with another user. The IAE 110, at step 1508, then provides the user with the option to share this information via one or more mechanisms such as, but not limited to, SMS, MMS, email, social networks, or the like. The user selects one of these options and the IAE 110, at step 1510, sends the information (or at least a portion of the information) to the other user(s) via the mechanism(s) selected by the user.

Figure 16:
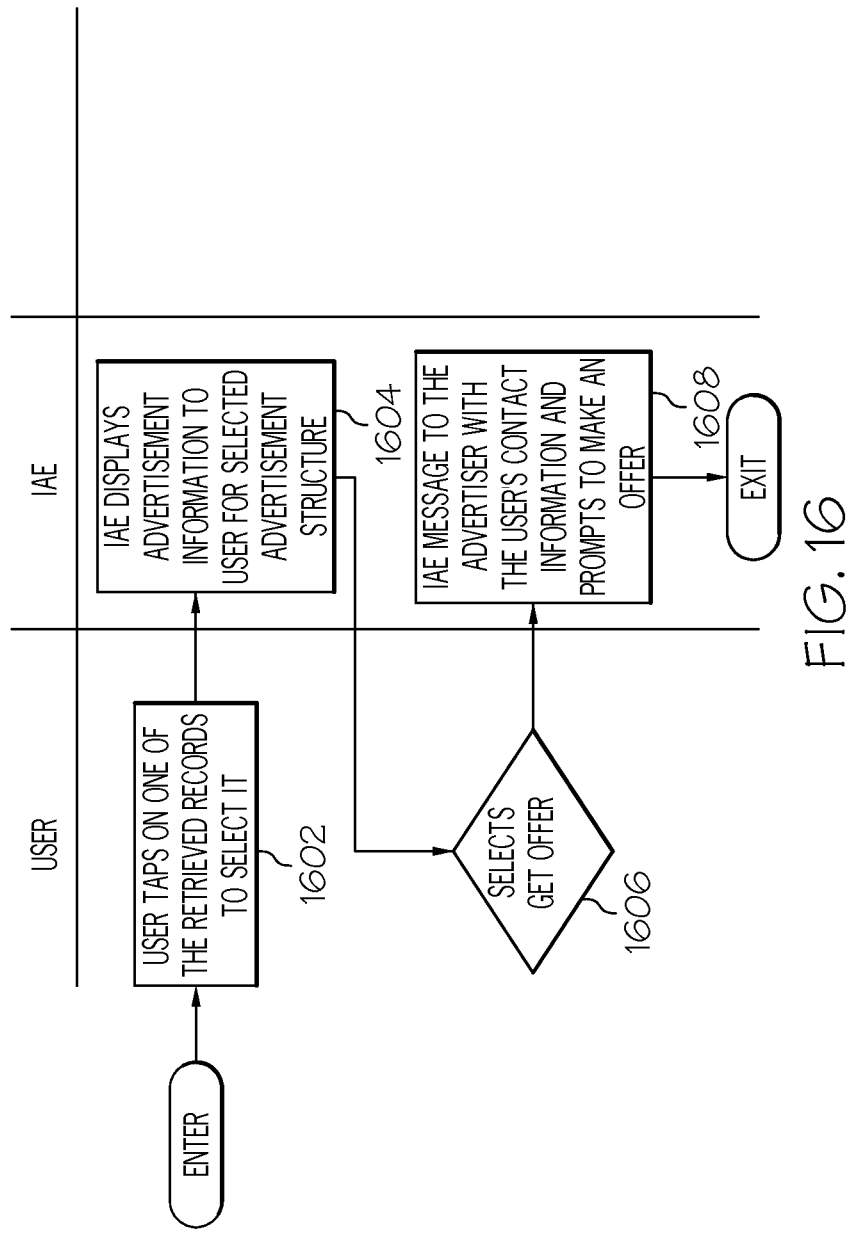

As discussed above, the users can also receive personalized offers from advertisers through the IAE 110. FIG. 16 shows one example of this example. For example, the user, at step 1602, selects the physical advertisement structure widget 706 displayed on the IAE 110. The IAE 110, at step 1604, displays advertisement information to the user for the selected advertisement structure 706, as shown in FIG. 10. The user, at step 1606, via the IAE 110 selects an option to obtain a personalized offer from the advertiser 1002. The IAEM 108, at step 1608, then sends the advertiser the user's contact information from the user profiles 116 with an instruction to send the user a personalized offer. The advertiser can then directly send the user a personalized offer using the contact information or the personalized offer can be sent to the IAEM 108. The IAEM can then send this offer to the user via the IAE 110. Also, the offer can be stored on the user's device 102 and displayed to the user upon selection of this offer.

As can be seen from the above discussion, various examples of the present invention are advantageous over conventional advertising systems because they provide an interactive environment for advertisers utilizing physical advertisement structures to provide their advertisements to users. Users are able to receive advertisement information associated with the advertisements on these structures along with additional information associated with the advertisements. This is also beneficial for the advertisers because this static form of advertising now becomes dynamic and interactive. Advertisers are now able to provide more detailed information regarding their products, services, etc. than what is normally available via an advertisement structure such as a billboard.

Figure 17:
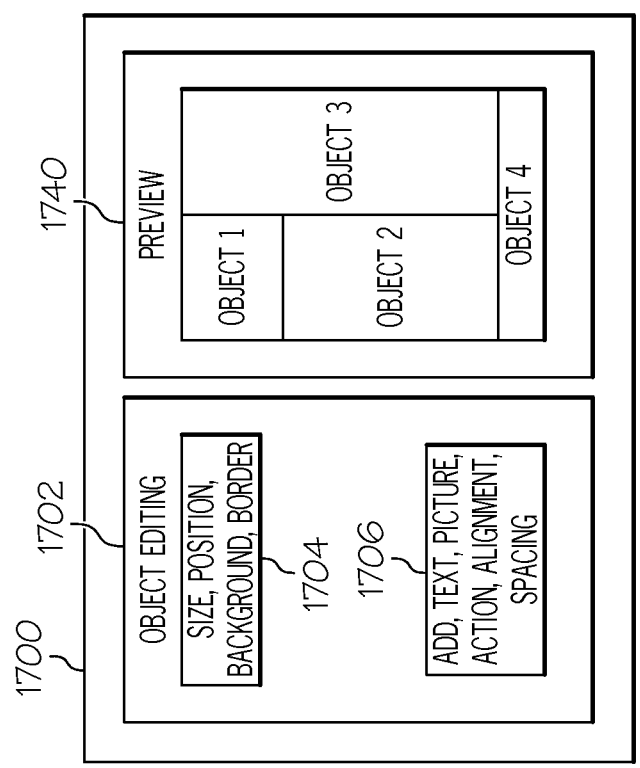
FIG. 17 is a screen shot of an editing tool for creating content layout according to one example of the present invention.

FIG. 17 is a screen shot of an example editing tool for creating content layout in column 378 of table 300 according to one example of the present invention. Shown is a screen 1700 with a left region for object editing 1804 and the preview side 1742. After an object is created or selected from the set of object labeled Object 1, Object 2, Object 3 and Object 4 on the preview side 1742, the attributes with the object are editable on the object editing 1704 side with the ability to change size, position, background of the border of an object 1706 and add test, pictures, alignment, spacing to the object in 1708. This content editing allows the advertiser to manage how information is presented. Once finished, the advertiser stores the template and this template is referenced in column 378. All the content associated with the template is also stored. In one example, this template in column 378 is applied to all content from a given advertiser. This is particularly useful, when an advertiser has multiple billboards that they are managing and want to keep consistent look and feel for fonts, logos, pictures and layouts in one pre-defined presentation layout or content layout.

Figure 18:
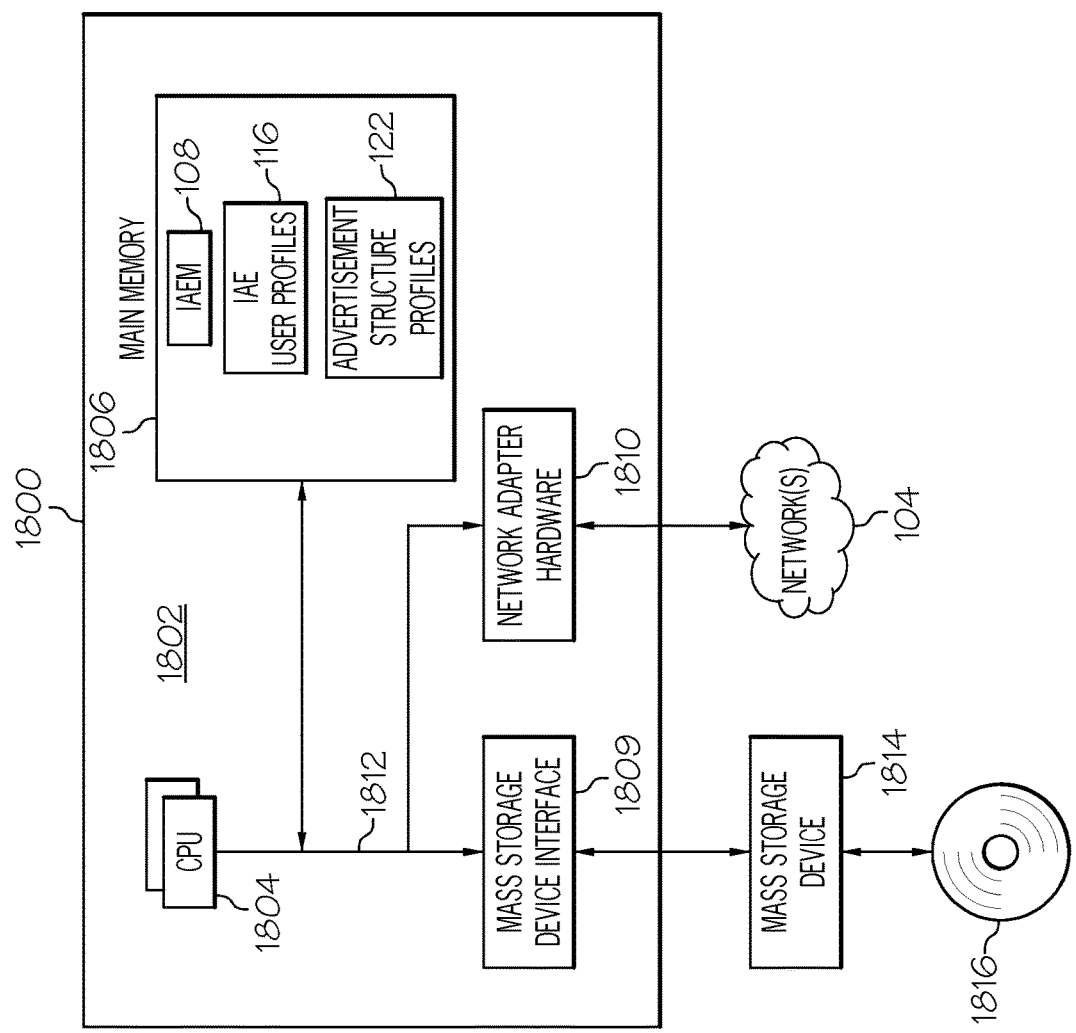
FIG. 18 is a block diagram illustrating a detailed view of an information processing system according to one example of the present invention.

FIG. 18 is a block diagram illustrating a more detailed view of an information processing system 1800, such as the server system 106, that can be utilized in the operating environment 100 discussed above with respect to FIG. 1. The information processing system 1800 is based upon a suitably configured processing system adapted to implement one or more examples of the present invention. Similarly, any suitably configured processing system can be used as the information processing system 1800 by examples of the present invention.

The information processing system 1800 includes a computer 1802. The computer 1802 has a processor(s) 1804 that is connected to a main memory 1806, mass storage interface 1808, and network adapter hardware 1810. A system bus 1812 interconnects these system components. The main memory 1806, in one example, comprises the IAEM 108 and its components as well as the IAE user profiles 116 and the advertisement structure profiles 122 discussed above.

Although illustrated as concurrently resident in the main memory 1806, it is clear that respective components of the main memory 1806 are not required to be completely resident in the main memory 1806 at all times or even at the same time. In one example, the information processing system 1800 utilizes conventional virtual addressing mechanisms to allow programs to behave as if they have access to a large, single storage entity, referred to herein as a computer system memory, instead of access to multiple, smaller storage entities such as the main memory 1806 and data storage device 1816. Note that the term "computer system memory" is used herein to generically refer to the entire virtual memory of the information processing system 1800.

The mass storage interface 1808 is used to connect mass storage devices, such as mass storage device 1814, to the information processing system 1800. One specific type of data storage device or computer program product is an optical drive such as a CD/DVD drive, which may be used to store data to and read data from a computer readable medium or computer storage product such as (but not limited to) a CD/DVD 1816. Another type of data storage device is a data storage device configured to support, for example, NTFS type file system operations.

Although only one CPU 1804 is illustrated for computer 1802, computer systems with multiple CPUs can be used equally effectively. Examples of the present invention further incorporate interfaces that each includes separate, fully programmed microprocessors that are used to off-load processing from the CPU 1804. An operating system (not shown) included in the main memory is a suitable multi-tasking operating system such as any of the Linux, UNIX, Windows, and Windows Server based operating systems. Examples of the present invention are able to use any other suitable operating system. Some examples of the present invention utilize architectures, such as an object oriented framework mechanism, that allows instructions of the components of operating system (not shown) to be executed on any processor located within the information processing system 1800. The network adapter hardware 1810 is used to provide an interface to a network 104. Examples of the present invention are able to be adapted to work with any data communications connections including present day analog and/or digital techniques or via a future networking mechanism.

Although the exemplary examples of the present invention are described in the context of a fully functional computer system, those of ordinary skill in the art will appreciate that various examples are capable of being distributed as a program product via CD or DVD, e.g. CD 1816, CD ROM, or other form of recordable media, or via any type of electronic transmission mechanism.

Figure 19:
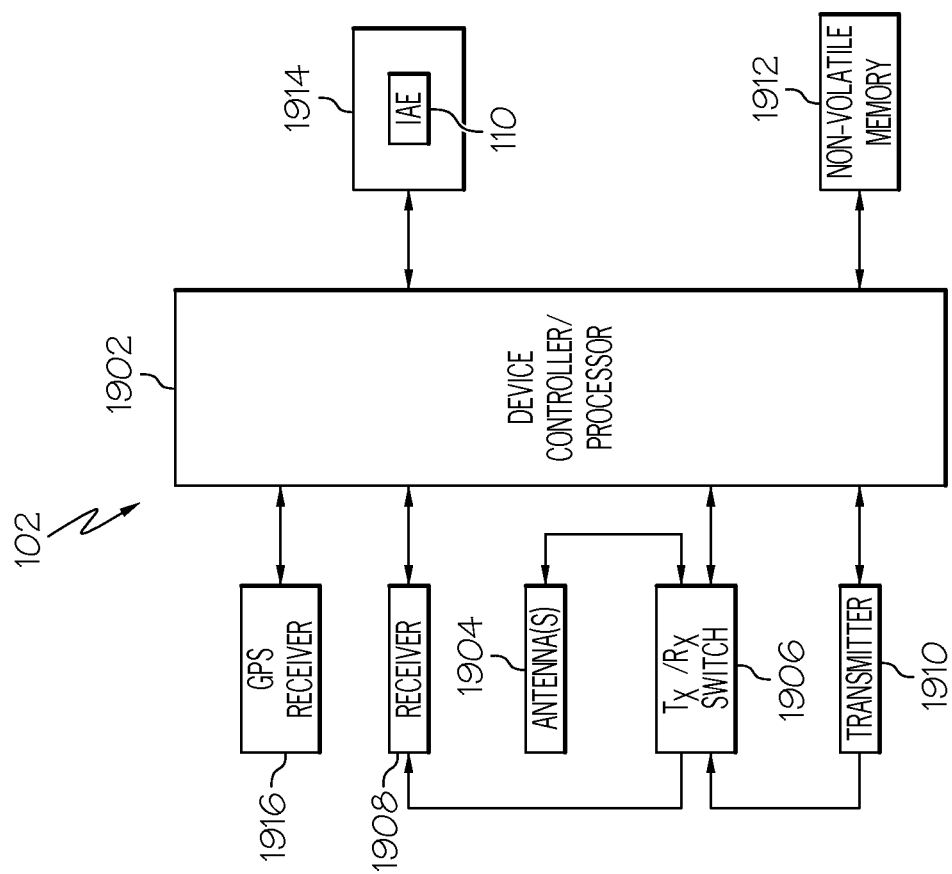
FIG. 19 is a block diagram illustrating a detailed view of a wireless device according to one example of the present invention.

FIG. 19 is a block diagram showing a more detailed view of the wireless device 102 in FIG. 1. It is assumed that the reader is familiar with wireless communication devices. To simplify the present description, only that portion of a wireless communication device that is relevant to the present invention is discussed. The wireless device 102, operates under the control of a device controller/processor 1902, that controls the sending and receiving of wireless communication signals. In receive mode, the device controller 1902 electrically couples at least one antenna 1906 through a transmit/receive switch 1906 to a receiver 1908. The receiver 1908 decodes the received signals and provides those decoded signals to the device controller 1902.

In transmit mode, the device controller 1902 electrically couples the at least one antenna 1904, through the transmit/receive switch 1906, to a transmitter 1910. The wireless device 102 can also include an additional transceiver as discussed above. For example, a multi-mode wireless device 102 can communicate over multiple channels and accordingly would utilize multiple transceivers. However, the receiver 1908 and transmitter 1910 pair can also provide the functionality of the transceiver discussed above. The wireless device 102 also includes volatile memory 1912 and non-volatile storage memory 1914. Either of these memories 1912, 1914 can comprise the IAE 110 discussed above. These components have been discussed above in greater detail. Lastly, as shown in FIG. 19, a GPS receiver module 1916 is used by the controller 1902 to determine a current location of the wireless device 102 in the universal coordinate system. It should be noted that other location determination technologies (e.g., A-GPS (Assisted Global Positioning Satellite), gyro based dead reckoning, accelerometer based determination, etc.) can be used in combination with, or as a substitute for, the GPS receiver 1902.

The terminology used herein is for the purpose of describing particular examples only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The example was chosen and described in order to best explain the principles of the invention and the practical application, and to enable others of ordinary skill in the art to understand the invention for various embodiments with various modifications as are suited to the particular use contemplated.

What is claimed is:

1. A method, with a wireless device, for providing an interactive advertising environment based on a physical advertisement structure to a user of a wireless device, the method comprising:
   receiving, by an information processing system, a request from a wireless device to identify one or more physical advertisement structures currently presenting at least one advertisement and situated within a user selectable radius and time from a current location of the wireless device, wherein each physical advertisement structure has a corresponding physical advertisement structure profile comprising information about the at least one advertisement, a geographic location of the physical advertisement structure and a time associated with the rendered advertisement at the physical advertisement structure;
   determining the current location and time of the wireless device from a location determining module of the wireless device;
   comparing the current location of the wireless device to the geographic locations of the physical advertisement structures as provided in their corresponding physical advertisement structure profiles to identify a set of nearby physical advertisement structures and their associated advertisement that are situated within the user-selectable radius and time from the current location of the wireless device;
   identifying the set of nearby physical advertisement structures whose geographic locations are within the user selectable radius and time from the current location of the wireless device that has been determined;
   obtaining based on the identifying of the set of nearby physical advertisement structures, a set of location information from the advertisement structure profile associated with each physical advertisement structure in the set of nearby physical advertisement structures and each advertisement being presented thereon;
   identifying, at least one localized offer associated with the advertisement currently being presented on at least one of the set of nearby physical advertisement structure, the at least one localized offer being localized based on the current location of the wireless device;
   sending the set of location information and the at least one localized offer to the wireless device; and
   updating a user profile associated with the wireless device based on the at least one localized offer.

2. The method of claim 1, wherein the request comprises at least a location information associated with the current location of the wireless device; and
   a time period associated with the users length of stay at the current location.

3. The method of claim 1, wherein the set of nearby physical advertisement structures comprises:
   a dynamic billboard with a set of advertisements that changes over a time period; and wherein each advertisement in the set of advertisement is associated with a separate advertisement profile.

4. The method of claim 1, wherein identifying the set of nearby physical advertisement structures further comprises:
   comparing the current location of the wireless device to a latitude and longitude associated with each physical advertisement structure in the physical advertisement structures as provided in their corresponding physical advertisement structure profiles.

5. The method of claim 1, wherein the set of location information associated with each nearby physical advertisement structure comprises at least one of:
   advertisement information associated with an advertisement presented on each nearby physical advertisement structure;
   additional advertisement information not displayed on the nearby physical advertisement structure;
   a set of links to at least one of audio files, video files, and a website associated with an advertiser; and
   advertiser identifying information.

6. The method of claim 1, further comprising:
   receiving a request from the wireless device to present at least a portion of the set of information in a second national language which is different than a first national language; and
   based on the request for a second national language being received, sending at least a portion of the set of information in a second national language to the wireless device.

7. The method of claim 1, further comprising:
   receiving a request from the wireless device to present the localized offer; and
   based on the request for the localized offer, sending the localized offer to the wireless device.

8. The method of claim 1, further comprising:
   formatting a least a portion of the set of location information into a pre-defined presentation layout for the wireless device, wherein the pre-defined presentation layout comprises, for each physical advertisement structure of the set of nearby physical advertisement structures:
   a selectable graphical image representing the advertisement presented on the nearby physical advertisement structure; and
   distance and time information indicating a distance and time from the current location of the wireless device to the nearby physical advertisement structure.

9. A method, with a wireless device, for providing an interactive advertising environment based on a physical advertisement structure to a user of a wireless device, the method comprising:
   receiving, by a wireless device, a request from a user to identify one or more physical advertisement structures currently presenting at least one advertisement and situated within a given user-selectable radius and time from a current location of the wireless device, wherein each physical advertisement structure has a corresponding physical advertisement structure profile comprising information about the at least one advertisement, a geographic location of the physical advertisement structure and a time associated with the rendered advertisement at the physical advertisement structure;

obtaining a set of location and time information associated with the current location of the wireless device from a location determining module of the wireless device;

sending a query to an information processing system for a first set of information, the query at least comprising the set of location information associated with the current location of the wireless device to be compared with the geographic locations of the physical advertisement structures as provided in their corresponding physical advertisement structure profiles to identify a set of nearby physical advertisement structures and their associated advertisements that correspond to and are situated within the user-selectable radius and time from the current location of the wireless device;

receiving, from the information processing system, the first set of information, wherein the first set of information comprises one or more graphical representations of the set of nearby physical advertisement structures whose geographic locations are within a the user-selectable radius and time from the current location of the wireless device;

displaying, based on the receiving, the one or more graphical representations of the set of nearby physical advertisement structures to the user via an interface;

receiving a selection of at least one of the one or more graphical representations from the user;

displaying, based on receiving the selection, a second set of information associated with the nearby physical advertisement structure corresponding to the graphical representation that has been selected, the second set of information being based on the first set of information that has been received and is displayed to the user via the interface;

receiving a selection from the user of the second set of information;

prompting, based on receiving the selection from the user of the second set of information, the user with a set of actions associated with the second set of information;

receiving a selection from the user of at least one of the set of actions to save at least the second set of information to a user profile associated with the user; and notifying the information processing system to save the at least the second set of information to the user profile.

10. The method of claim 9, wherein the one or more graphical representations are pictures displayed on the interface comprise, for each physical advertisement structure of the set of nearby physical advertisement structures:

a selectable graphical image representing comprising the at least one advertisement presented on the nearby physical advertisement structure; and distance and time information indicating a distance and time from the current location of the wireless device to the nearby physical advertisement structure.

11. The method of claim 9, wherein the second set of information comprises at least one of:

advertisement information associated with an advertisement being currently presented on each nearby physical advertisement structure;

additional advertisement information not displayed on the nearby physical advertisement structure;

a set of links to at least one of audio files, video files, and a website associated with an advertiser; and advertiser identifying information.

12. A wireless device for providing an interactive advertising environment to a user of the wireless device, the wireless device comprising:

memory;

at least one processor communicatively coupled to the memory configured to:

receive, from a user, a request to identify one or more nearby physical advertisement structures currently presenting at least one advertisement and situated within a given user-selectable radius and time from a current location of the wireless device, wherein each physical advertisement structure has a corresponding physical advertisement structure profile comprising information about the at least one advertisement and a geographic location and time of the physical advertisement structure;

obtain, based on receiving the request, a set of location information associated with the current location and time of the wireless device from a location determining module of the wireless device;

send a query to an information processing system for a first set of information, the query at least comprising the set of location information associated with the current location and time of the wireless device to be compared with the geographic locations of the physical advertisement structures and time as provided in their corresponding physical advertisement structure profiles to identify a set of nearby physical advertisement structures and their associated advertisements that correspond to and are situated within the user-selectable radius and time from the current location of the wireless device;

receive, from the information processing system, the first set of information, wherein the first set of information comprises one or more graphical representations of a set of nearby physical advertisement structures whose geographic locations are within the given user-selectable radius and time from the current location of the wireless device, and a set of distance and time information indicating a distance and time from the wireless device to the one or more nearby physical advertisement structures;

display, based on the receiving, the one or more graphical representations of the set of nearby physical advertisement structures within the given user-selectable radius and time from the wireless device to the user via an interface, wherein the one or more graphical representations comprise at least the advertisement presented by the one or more nearby physical advertisement structures, and wherein the one or more graphical representations are displayed with the set of distance and time information indicating a distance and time from the wireless device to the one or more nearby physical advertisement structures;

receive a selection from the user of at least one of the one or more graphical representations from the user;

display, based on receiving the selection, a second set of information associated with the nearby physical advertisement structure corresponding to the graphical representation that has been selected, the second set of information being based on the first set of information that has been received and is displayed to the user via the interface;

receive a selection from the user of the second set of location information; prompt, based on receiving the selection from the user of the second set of information, the user with a set of actions associated with the second set of information, receive a selection from the user of at least one of the set of actions to save at least the second set of information to a user profile associated with the user; and notify the information processing system to save the at least the second set of information to the user profile.

13. The system of claim 12, wherein the second set of information comprises at least one of:

advertisement information associated with an advertisement presented on each nearby physical advertisement structure;

additional advertisement information not displayed on the nearby physical advertisement structure;

a set of links to at least one of audio files, video files, and a website associated with an advertiser; and advertiser identifying information.

14. A computer program product tangibly embodying computer readable non-transitory instructions which, when implemented, cause a computer to carry out the steps of a method for providing an interactive advertising environment to a user of a wireless device, the method comprising:

receiving, by a wireless device, a request from a user to identify a first set of information comprising one or more physical advertisement structures currently presenting at least one advertisement and situated within a given user-selectable radius and time from a current location of the wireless device, wherein each physical advertisement structure has a corresponding physical advertisement structure profile comprising information about the at least one advertisement and a geographic location of the physical advertisement structure;

obtaining a set of location and time information associated with the current location of the wireless device;

automatically sending, without user intervention, a query to an information processing system for the first set of information, the query at least comprising the set of location information associated with the current geographic location of the wireless device to be compared with the geographic locations of the physical advertisement structures as provided in their corresponding physical advertisement structure profiles to identify a set of nearby physical advertisement structures and their associated advertisements that correspond to and are situated within the user-selectable radius and time from the current location of the wireless device;

receiving, from the information processing system, the first set of information, where the first set of information comprises one or more graphical representations of the set of nearby physical advertisement structures being within a given threshold distance the user-selectable radius and time from the current location of the wireless device;

displaying, based on the receiving, the one or more graphical representations of the one or more set of nearby physical advertisement structures to the user via an interface; and receiving a selection of at least one of the one or more graphical representations from the user; and displaying, based on receiving the selection, a second set of information associated with the set of nearby physical advertisement structure structures corresponding to the graphical representation that has been selected, the second set of information being based on the first set of information that has been received and is displayed to the user via the interface.

15. The computer program product of claim 14, wherein the second set of information comprises advertisement information associated with an advertisement presented on each nearby physical advertisement structure.

16. The method of claim 1, wherein updating a user profile comprises:

storing the at least one localized offer in the user profile.

17. The method of claim 1 wherein identifying the set of nearby physical advertisement structures further comprises identifying nearby physical advertisement structures that are in motion.

18. The method of claim 1 wherein receiving the request from the wireless device comprises receiving a voice request.

19. The method of claim 9 wherein the method is launched by the user engaging a selectable graphical user interface.

20. The method of claim 11 wherein the set of links further comprise, for each physical advertisement structure of the set of nearby physical advertisement structures, at least one of: a link to a text-to-speech feature and a link to a voice recognition feature.

* * * * *